United States Patent
Taubenberger et al.

[11] Patent Number: 6,017,059
[45] Date of Patent: Jan. 25, 2000

[54] KNEE PROTECTION SYSTEM FOR MOTOR VEHICLES

[75] Inventors: Josef Taubenberger, Bruckmuehl; Hans Rathgeber, Munich; Gerhard Rackl, Unterfoehring, all of Germany

[73] Assignee: Bayerische Motoren Werke Aktiengesellschaft, Germany

[21] Appl. No.: 09/044,977

[22] Filed: Mar. 20, 1998

[30] Foreign Application Priority Data

Mar. 20, 1997 [DE] Germany .......................... 197 11 688

[51] Int. Cl.⁷ .................................................. B60R 21/22
[52] U.S. Cl. ...................... 280/752; 280/730.1; 280/733
[58] Field of Search ................................ 280/752, 730.1, 280/751, 728.1, 743.1, 733, 805; 188/371, 377

[56] References Cited

U.S. PATENT DOCUMENTS

| | | | |
|---|---|---|---|
| 3,838,870 | 10/1974 | Hug | 280/805 |
| 3,856,103 | 12/1974 | Scholz et al. | 280/752 |
| 3,866,940 | 2/1975 | Lewis | 280/733 |
| 3,888,503 | 6/1975 | Hamilton | 280/733 |
| 3,889,969 | 6/1975 | Otani | 280/805 |
| 3,951,427 | 4/1976 | Wilfert | 280/732 |
| 4,027,906 | 6/1977 | Matsuoka et al. | 280/751 |
| 5,797,620 | 8/1998 | Eyrainer | 280/730.1 |

FOREIGN PATENT DOCUMENTS

| | | |
|---|---|---|
| 39 10 008 | 10/1989 | Germany . |
| 39 34 588 | 4/1991 | Germany . |
| 41 32 566 | 4/1992 | Germany . |
| 41 06 685 | 6/1994 | Germany . |
| 295 17 953 U | 2/1996 | Germany . |
| 44 39 576 | 5/1996 | Germany . |
| 95/35226 | 12/1995 | WIPO . |

*Primary Examiner*—Christopher P. Ellis
*Attorney, Agent, or Firm*—Evenson, McKeown, Edwards, & Lenahan, P.L.L.C.

[57] ABSTRACT

Knee protection system for motor vehicles, comprising an air bag module having an air bag arranged in the impact area of an occupant's knees and fixedly connected with the vehicle at two clamping points. To increase the deceleration path, the air bag is connected to the vehicle by a force limiting device at at least one clamping point.

34 Claims, 2 Drawing Sheets

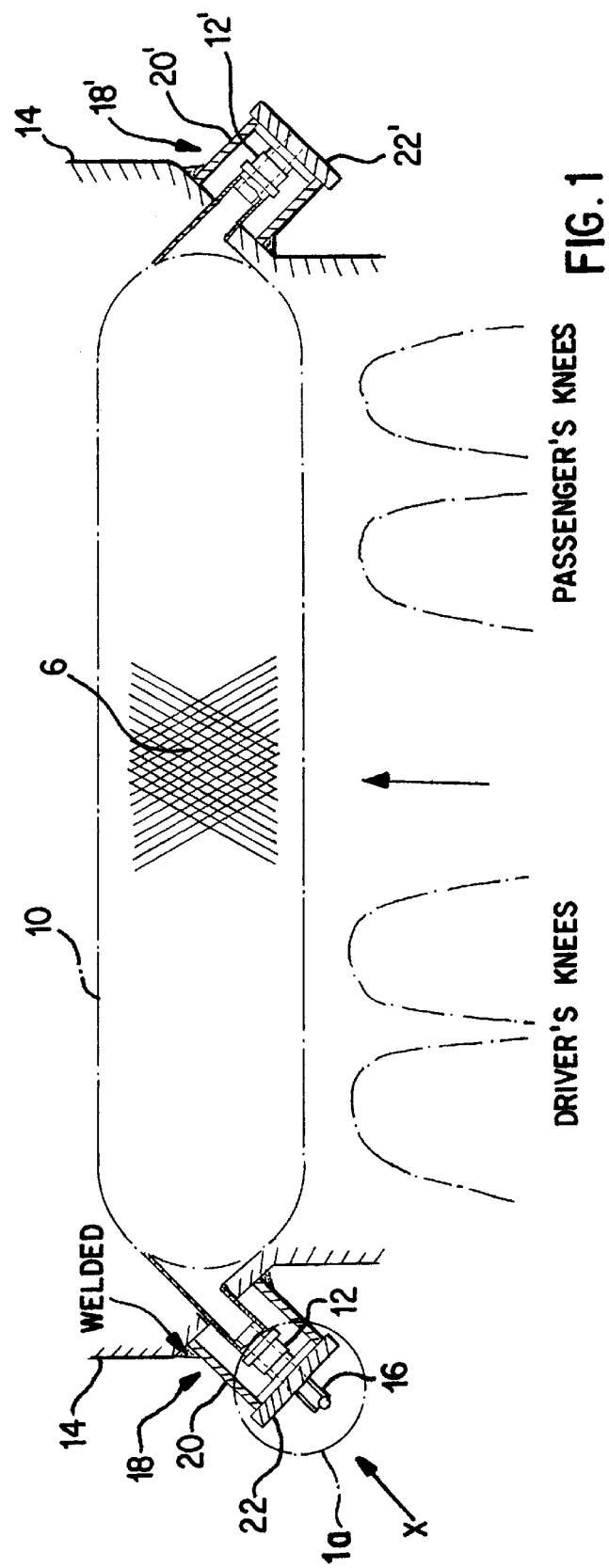
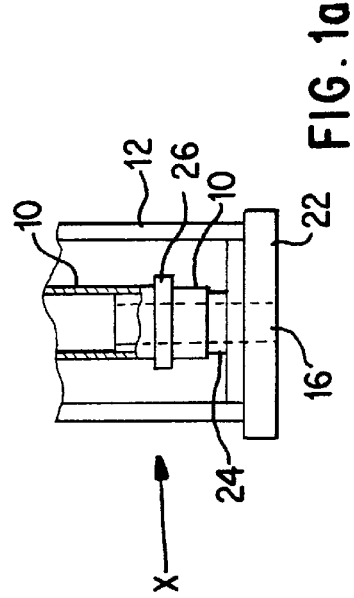

KNEE PROTECTION SYSTEM FOR MOTOR VEHICLES

BACKGROUND AND SUMMARY OF THE INVENTION

This application claims the priority of German patent document 197 11 688.4 filed Mar. 20, 1997, the disclosure of which is expressly incorporated by reference herein.

The invention relates to a knee protection system for motor vehicles, comprising an air bag module having an air bag which is arranged in the impact area of an occupant's knees and which is fixedly connected with the vehicle. Preferred embodiments of the invention provide such an airbag connected at two clamping points.

In a knee protection system of this type, called active knee protection, the air bag will inflate between the underpanelling and the occupant's knees in the event of a sudden deceleration of the vehicle. By inflating the air bag, the knee protection system is guided into the occupant so that he takes part as early as possible in the deceleration of the motor vehicle. In such an active knee protection system, the unfavorable flux of force of the air bag is a disadvantage. Immediately after activating the air bag module, the air bag must be inflated sufficiently tautly to prevent a hitting-through of the occupant's knees against the underpanelling of the motor vehicle. Since, among other things, the forces exercised on the air bag depend on the occupant's weight, it is virtually impossible to design the air bag module such that it causes an optimal deceleration for occupants of different weights.

Passive knee protection is also known. In passive knee protection, an energy-dissipating padding is rigidly installed in the vehicle in the impact areas of the knees. This padding depends on the shaping of the panelling parts and impairs the moving space. An important disadvantage is that because of the distance of the knees from the padding in the normal sitting position, the occupant only later participates in the deceleration of the vehicle, thereby resulting in higher stress to the occupant.

It is an object of the invention to further develop the active knee protection system of the above-mentioned type such that, independently of weight, the occupant is better protected in an accident.

According to the invention, this object is achieved in that the air bag is connected with the vehicle at at least one clamping point by a force limiting device. By means of a force limiting device, the deceleration due to the air bag is improved because the path available for decelerating the occupant's knees is increased. When, during a vehicle impact, the air bag module is activated and the air bag is inflated, the air bag will catch the occupant's knees while deforming itself. After a defined deceleration force is exceeded, the force limiting device becomes operative and permits a movement of the whole air bag under the applied stress.

The force limiting device is preferably an energy-dissipating element. The energy-dissipating element is preferably a plastically deformable element. In contrast to an energy-dissipating element based on friction, a plastically deformable element has the advantage that the course of the characteristic force path curve can be precisely defined.

The plastically deformable element may, for example, be constructed as an upset tube. A course of the characteristic force path curve which is particularly favorable can be achieved by a plastically deformable element constructed as an inverted tube or as a corrugated tube.

The air bag preferably comprises an enveloping fabric with mutually diagonally crossing threads. The enveloping fabric has the advantage that the air bag is shortened while it is inflating and, as a result, is stretched between the two clamping points.

For a slow deceleration, that is, for a soft catching of the occupant's knees, it is advantageous for the air bag to have a flow-out capability. In a serious accident, the air is first displaced from such an air bag by the occupant's impacting knees, whereby the knees are softly decelerated. When the damping capacity of the air bag has been used up in certain preferred embodiments, the force limiting device mounted at one or both clamping points becomes operative and permits an additional deceleration path.

Other objects, advantages and novel features of the present invention will become apparent from the following detailed description of the invention when considered in conjunction with the accompanying drawings.

BRIEF DESCRIPTION OF THE DRAWINGS

FIG. 1 is an overhead, schematic view of an air bag module installed across the entire width of a motor vehicle, constructed according to a preferred embodiment of the present invention;

FIG. 1a is an exploded view of area X of FIG. 1;

DETAILED DESCRIPTION OF THE DRAWINGS

Figure 2:
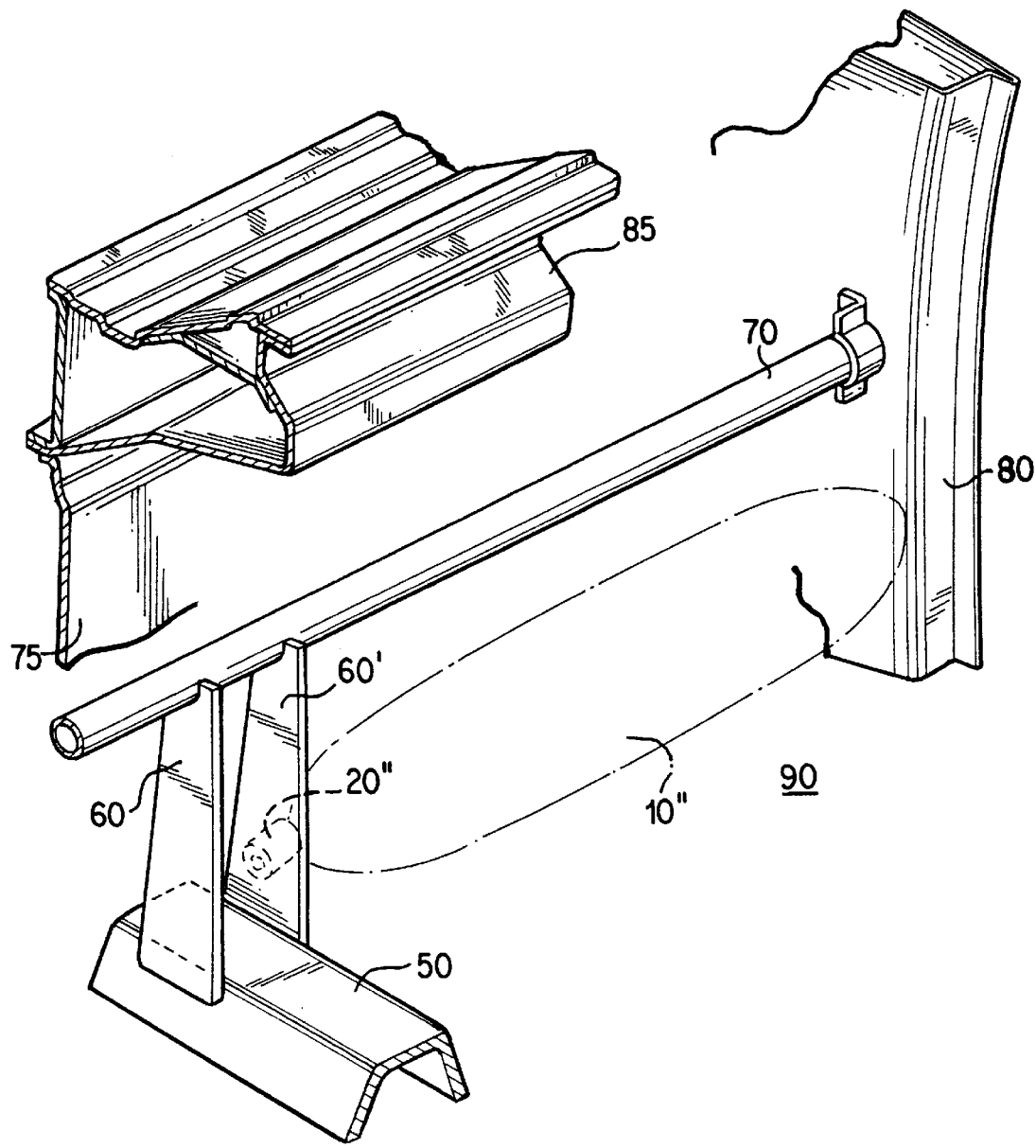
FIG. 2 is a perspective, schematic view of an air bag module installed across the width of a single seat according to another preferred embodiment of the present invention.

The invention will be explained in detail by means of a preferred embodiment illustrated in the drawings.

In FIG. 1, a hose-shaped air bag 10 has attachments 12, 12' at two end areas. The attachments fasten the air bag 10 to an outlined underpanelling 14 of a motor vehicle. The left attachment 12 is used as the feeding device 16 by which the air bag 10 is connected with a generator (not shown). The air bag 10 comprises a fabric having mutually diagonally crossing threads 6. The diagonal crossing of the threads to the longitudinal axis of the air bag 10 results in the air bag 10 shortening upon inflation. The fabric of the air bag 10 is not tight but has a flow-out capability. In the area of its two attachments 12, 12' the air bag 10 is fastened to the underpanelling 14 by force limiting devices 18, 18'. Force limiting devices 18, 18' have identical construction and include upset tubes 20, 20' fastened to underpanelling 14 and supporting, on their respective free ends, lids 22, 22'. Lids 22, 22' are fixedly connected (e.g., by welding) to upset tubes 20, 20'. The attachments 12, 12' of the air bag 10 are guided through openings of underpanelling 14 and are fixedly connected with lids 22, 22' of their respective upset tubes 20, 20'. The connection of attachments 12, 12' with lids 22, 22' can be constructed in different manners and is not shown in detail in the drawing.

In the event of collision impact forces on the motor vehicle, the generator (not shown) triggers and inflates air bag 10 through feed line 16 and left attachment 12. As a result, the originally slack air bag 10 is axially shortened and stretched between two clamping points formed by force limiting devices 18, 18'. As soon as an occupant's knees impact inflated air bag 10, the gas is pressed out of the air bag 10 as the knees press into the air bag. The maximal deceleration force is achieved when the air bag 10 is pressed flat and its walls rest upon one another in the knee region. The deceleration force is transmitted by attachments 12, 12' of air bag 10 to respective lid 22, 22' to upset tubes 20, 20' and to underpanelling 14. When this deceleration force exceeds a defined limit, a plastic deformation of the upset tubes 20, 20' results. The plastic deformation of upset tubes 20, 20' absorbs energy and creates an additional deceleration path. Since the deceleration force exercised on the occupant's knees is inversely proportional to the deceleration path, the stress exercised on the knees is reduced.

By means of the force limiting devices 18, 18' the deceleration provided by air bag 10 is improved and/or its effectiveness is prolonged because first the air bag and then the force limiting devices are deformed.

Deviating from the illustrated embodiment of FIGS. 1 and 1a, upset tubes 20, 20' of the force limiting devices 18, 18' may also be constructed as inverted tubes or corrugated tubes. The force limiting device may also be constructed such that the energy is destroyed by friction. However, in the case of a friction-type force limiting device of this type, the characteristic force path curve is not as clearly defined.

The air bag 10 may extend over the entire width of the motor vehicle or it may extend only over the width of a single seat.

In a constructively simplified, modified embodiment of the knee protection system shown in FIG. 1, the air bag 10 is connected by attachment 12 with underpanelling 14 by a force limiting device 18 as shown and is connected by attachment 12' directly with underpanelling 14 without the interposing of force delimiting device 18'.

In FIG. 1a, illustrating details of an embodiment of the force limiting device 18, the attachment 12 of air bag 10 is connected to lid 22 by pin 24 which extends into attachment 12. The pin 24 and lid 22 create a throughfare for the air bag 10 inflating gas from feed line 16. The feedline 16 completes the throughfare, providing a connection point with the generator (not shown). The pin 24 and lid 22 are integrated. The air bag 10 receives pin 24 and is fastened with a hose clamp 26.

In FIG. 2, in a second embodiment, the air bag module 10" has been installed across the width of a single seat and connected to the structure of the motor vehicle via upset tube 20".

Upset tube 20" is connected to support bracket 60'. Center tunnel 50' provides a base for support brackets 60, 60' which, in turn, support shaft 70 which spans the width of the single seat (i.e., across the footwell) and connects to A-pillar 80 of motor vehicle. Front wall 75 is formed in dashboard structure 85. The front wall 75, dashboard structure 85, A-pillar 80, shaft 70, and support bracket 60' define passenger space 90.

FIG. 2 illustrates a second embodiment of the invention installed across the width of a single seat on the right hand side of a vehicle. It should be understood that a corresponding structure may be provided for the left hand side of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A knee protection system for a motor vehicle, the knee protection system comprising an air bag module having an air bag which is arranged in an impact area of an occupant's knees and is fixedly connected with a motor vehicle, wherein the air bag is connected with the motor vehicle by a force limiting device at at least one clamping point.

2. A knee protection system according to claim 1, wherein the air bag module is fixedly connected with the vehicle at two clamping points.

3. A knee protection system according to claim 2, wherein the force limiting device comprises an energy-dissipating element.

4. A knee protection system according to claim 2, wherein the force limiting device comprises a plastically deformable element.

5. A knee protection system according to claim 4, wherein the plastically deformable element is an upset tube.

6. A knee protection system according to claim 4, wherein the plastically deformable element is an inverted tube.

7. A knee protection system according to claim 4, wherein the plastically deformable element is a corrugated tube.

8. A knee protection system according to claim 2, wherein the air bag comprises an enveloping fabric with mutually diagonally crossing threads.

9. A knee protection system according to claim 3, wherein the air bag comprises an enveloping fabric with mutually diagonally crossing threads.

10. A knee protection system according to claim 4, wherein the air bag comprises an enveloping fabric with mutually diagonally crossing threads.

11. A knee protection system according to claim 5, wherein the air bag comprises an enveloping fabric with mutually diagonally crossing threads.

12. A knee protection system according to claim 6, wherein the air bag comprises an enveloping fabric with mutually diagonally crossing threads.

13. A knee protection system according to claim 7, wherein the air bag comprises an enveloping fabric with mutually diagonally crossing threads.

14. A knee protection system according to claim 2, wherein the air bag has a flow-out capability.

15. A knee protection system according to claim 3, wherein the air bag has a flow-out capability.

16. A knee protection system according to claim 4, wherein the air bag has a flow-out capability.

17. A knee protection system according to claim 5, wherein the air bag has a flow-out capability.

18. A knee protection system according to claim 6, wherein the air bag has a flow-out capability.

19. A knee protection system according to claim 7, wherein the air bag has a flow-out capability.

20. A knee protection system according to claim 1, wherein said air bag, when deployed, extends over at least an entire width of a vehicle seat.

21. A knee protection system according to claim 20, wherein said air bag, when deployed, extends over an entire width of a motor vehicle footwell.

22. A knee protection system according to claim 20, wherein said air bag, when deployed, extends over an entire width of the motor vehicle.

23. A two-stage knee protection system for a motor vehicle, comprising:

an air bag module comprising an air bag arranged in an impact area of an occupant's knees and at least one attachment coupled to said air bag, said air bag being inflatable to provide a first-stage protection, and at least one means for limiting an impact force between said air bag and said occupant's knees, said means for limiting engaging said at least one attachment, wherein said means for limiting provides a second-stage protection.

24. A knee protection system according to claim 23, wherein said means for limiting comprises an energy-dissipating element supported on the motor vehicle.

25. A knee protection system according to claim 23, wherein said means for limiting comprises a plastically deformable element supported on the motor vehicle.

26. A knee protection system according to claim 25, wherein said plastically deformable element is an upset tube.

27. A knee protection system according to claim 25, wherein said plastically deformable element is an inverted tube.

28. A knee protection system according to claim 25, wherein said plastically deformable element is a corrugated tube.

29. A system for protecting a motor vehicle occupant's knees in a motor vehicle having an air bag module including an air bag arranged in an impact area of an occupant's knees and including at least one attachment coupled to said air bag, said system comprising:

at least one means for limiting an impact force between said air bag and said occupant's knees, said means for limiting engaging said at least one attachment.

30. A system according to claim 29, wherein said means for limiting comprises an energy-dissipating element supported on the motor vehicle.

31. A system according to claim 29, wherein said means for limiting comprises a plastically deformable element supported on the motor vehicle.

32. A knee protection system according to claim 31, wherein said plastically deformable element is an upset tube.

33. A knee protection system according to claim 31, wherein said plastically deformable element is an inverted tube.

34. A knee protection system according to claim 31, wherein said plastically deformable element is a corrugated tube.

* * * * *